US006779310B2

(12) United States Patent
Grover

(10) Patent No.: US 6,779,310 B2
(45) Date of Patent: Aug. 24, 2004

(54) SECURE PUBLIC STORAGE LOCKERS

(76) Inventor: Steven Grover, 800 Heinz Ave., Studio 11, Berkeley, CA (US) 94710

( * ) Notice: Subject to any disclaimer, the term of this patent is extended or adjusted under 35 U.S.C. 154(b) by 0 days.

(21) Appl. No.: 10/032,748

(22) Filed: Dec. 27, 2001

(65) Prior Publication Data

US 2002/0095960 A1 Jul. 25, 2002

Related U.S. Application Data

(63) Continuation-in-part of application No. 09/591,210, filed on Jun. 9, 2000, now abandoned.
(60) Provisional application No. 60/138,304, filed on Jun. 9, 1999.

(51) Int. Cl.[7] .......................... E04B 1/344; E04H 6/42; E95B 49/00
(52) U.S. Cl. ...................... 52/79.4; 52/652.1; 52/653.1; 52/DIG. 14; 292/302; 70/278.2
(58) Field of Search ............................... 52/79.4, 79.12, 52/648.1, 651.11, 652.1, 653.1, DIG. 14; 292/300, 302, 29, 341.5; 7/278.2, 278.1, 278.5; 340/5.2

(56) References Cited

U.S. PATENT DOCUMENTS

| 1,348,001 | A |   | 7/1920  | Fohn             |        |
|-----------|---|---|---------|------------------|--------|
| 1,774,783 | A |   | 9/1930  | Worley Jr. et al.|        |
| 1,892,446 | A |   | 12/1932 | Carr             |        |
| 1,892,447 | A |   | 12/1932 | Carr et al.      |        |
| 2,153,088 | A |   | 4/1939  | Knell            |        |
| 3,314,390 | A | * | 4/1967  | Fitzpatrick ...... | 292/21 |
| 3,722,236 | A |   | 9/1973  | Zelenko          |        |
| 4,306,390 | A | * | 12/1981 | Brown ........... | 52/67  |

(List continued on next page.)

FOREIGN PATENT DOCUMENTS

| FR | 643994  | * | 9/1928  | ............ 52/DIG. 14 |
| FR | 2453245 | * | 4/1980  | ............ 52/DIG. 14 |
| SE | 238101  | * | 10/1945 | ............ 52/DIG. 14 |

OTHER PUBLICATIONS

SEL Specifications, http//americanlocker com/sespecifications htm, Aug. 6, 2003.
SEL Electronic Locker, http //americanlocker com/Sel.htm. Aug. 6, 2003.

(List continued on next page.)

Primary Examiner—Brian E. Glessner
(74) Attorney, Agent, or Firm—John W. Carpenter; Reed Smith LLP

(57) ABSTRACT

Public storage lockers are designed particularly for storage of bicycles, such as at a public transportation terminal. In a preferred embodiment the storage lockers are on-demand, lockable by a user who must unlock the locker using the same electronic key and who must unlock the locker before using the key for any other locker. The lockers are visually open, with a secure screen or mesh on the locker door and optionally on walls and top cover. This reveals that the bike locker is occupied and prevents the use of the locker for unauthorized, privacy-requiring activities. The bike enclosure has a floor wheel guide for conveniently loading the bike, and a special door latch mechanism which provides for security by including a latch bar in a fixed frame, while a latch bar lifter, operable to permit door opening when the lock is unlocked, is on the door. The door lock is always locked, in an available locked mode or an unavailable locked mode, except when unlocked for only a few seconds before the lock automatically locks down the latch bar again, so the door is locked as soon as re-closed. LED status indicator lights can be included. Preferably the lock and the electronic keys have logic which prevents use of the key if the user fails to reopen the lock within a prescribed period of time, and other safeguards.

50 Claims, 10 Drawing Sheets

U.S. PATENT DOCUMENTS

| | | | | |
|---|---|---|---|---|
| 4,500,122 A | * | 2/1985 | Douglas | 292/161 |
| 4,676,537 A | | 6/1987 | Esser | |
| 4,894,961 A | * | 1/1990 | Robbins | 52/69 |
| 5,036,796 A | * | 8/1991 | deMuy et al. | 119/481 |
| 5,245,801 A | * | 9/1993 | Boesvert | 52/63 |
| 5,507,121 A | * | 4/1996 | Taylor | 52/66 |
| 5,540,069 A | * | 7/1996 | Muller et al. | 70/278.2 |
| 5,591,950 A | * | 1/1997 | Imedio-Ocana | 235/382.5 |
| 2,071,732 A | | 2/1997 | Colly | |
| 5,690,234 A | * | 11/1997 | Rhead et al. | 211/22 |
| 5,749,253 A | | 5/1998 | Glick et al. | |
| 5,774,059 A | * | 6/1998 | Henry et al. | 340/5.54 |
| 5,823,027 A | | 10/1998 | Glick et al. | |
| 5,848,541 A | | 12/1998 | Glick et al. | |
| 5,886,644 A | * | 3/1999 | Keskin et al. | 340/5.73 |
| 6,036,316 A | | 3/2000 | Arita | |
| 6,116,066 A | * | 9/2000 | Gartner et al. | 70/278.1 |
| 6,318,137 B1 | * | 11/2001 | Chaum | 70/278.3 |
| 6,442,983 B1 | * | 9/2002 | Thomas et al. | 70/38 A |

OTHER PUBLICATIONS

SEL How It Works, http//americanlocker.com/selhowworks htm, Aug. 6, 2003.
SEL Pictures, nap //americanlocker com/selpictures htm.
SEL Installations, http //americanlocker com/selnstallations.html. Aug. 8, 2003.
American Locker Security Systems, Jamestown, NY. "Stainless Steel Storage Lockers," Apr. 2003.
Free Standing Locker to Wall, http //americanlocker com/freestandinglockertowall.htm, Aug. 6, 2003.
Locker Construction, http//americanlocker.com/plkallconst. htm, Aug. 6, 2003.
American Locker Security Systems, Jamestown, NY, "Laptop Computer Storage Lockers." Mar. 2003.
LTS–10 Laptop Storage Lockers, http//americanlockr com/its10 htm. Aug. 6, 2003.
LTS–10 Specifications, http//americanlocker com/lsspecs htm, Aug. 6, 2003.
LTS Installation, http //americanlocker.com/New_Folder/Installation htm. Aug. 6, 2003.
Promotional Brochure—"Laptop Storage Made Easy" American Locker Security Systems.
Compu–Lok–distribution System. nttp//americanlocker com/compulok.ntm, Aug. 6, 2003.
Promotional Brochure—"Compu–Lok—The Answer for Mail and More", American Locker Security Systems.
Compu–Lok Specifications. nttp //americanlocker com/cispecs htm, Aug. 6, 2003.
Compu–Lok Pictures, http //americanlocker.com/compuok-pictures htm, Aug. 6, 2003.
Locker Construction. http//americanlocker com/lockerconstruction.htm. Aug. 6, 2003.
Compu–Lok Libranan—How it Works, http //americanlocker.com/library.ntm Aug. 6, 2003.
Promotional Brochure "Delivery Expense. Answer the Challenge Compu–Lok" American Locker Security Systems.
E–CBU Library Edison. http//americanlocker com/ecbu htm, Aug. 6, 2003.
E–CBU Pictures, http //americanlocker com/ecbupictures htm. Aug. 6, 2003.
ECBU Specifications. http.//americanlocker.com/ecbudentails.html. Aug. 6, 2003.
Promotional Brochure, Evidence Lockers—Keyed/Keyless/60 Evidence Lockers, American Locker Security.
Keyless Evidence Lockers, http://americanlocker.com/keytessevidence htm, Aug. 8, 2003.
Keyless Evidence Locker Specifications, http://americanlocker.com/keylessspecifications html. Aug. 6, 2003.
Keyless Pictures, http //americanlocker com/keylesspictures.ntm. Aug. 6, 2003.
Keyless Evidence Installations. http //americanlocker com/keylessinstallation. Aug. 6, 2003.
American Locker Security Systems, Jamestown, NY. "Law Enforcement Lockers," Apr. 2003.
Promotional Brochure, "E–CBU Library Edition".
American Locker Security Systems, Jamestown, NY, "Computer Controlled Storage Lockers," Jun. 2002.

* cited by examiner

SECURE PUBLIC STORAGE LOCKERS

This application is a continuation-in-part of application Ser. No. 09/591,210, filed Jun. 9, 2000 now abandoned, which claimed priority under provisional application Serial No. 60/138,304, filed Jun. 9, 1999.

BACKGROUND OF THE INVENTION

The invention concerns public on-demand storage lockers, and in a specific embodiment, bicycle lockers such as may be used to store bicycles at a public transportation station. The invention has several aspects, including the manner of fabrication of the storage lockers, the secure latching mechanism and an electronic locking system.

The need for a highly secure, highly vandal-proof, on-demand public storage locking system is readily apparent. For example, in response to user demand, Bay Area Rapid Transit in the San Francisco Bay Area recently installed a large number of bicycle lockers with hasps designed to accommodate user-supplied locks. Unfortunately, these lockers have suffered from use as homeless shelters, fires as a consequence of homeless use, poor security characteristics due to the ease with which prying tools can be used when user-supplied mechanical locks are exposed, concern by police about potential for bomb planting, high maintenance costs due to lock clipping and locker cleaning requirements, and prevention of general availability by users who keep their locks on the lockers even when they are not storing a bike.

Standard coin/key locker locking systems have been tried for bike lockers (by the City of Palo Alto, Calif. for example), but have proven too vandal and damage-prone, and require lock cylinder changing when keys are lost.

High security mechanical key locks have proven successful for bike lockers, but require a long-term rental commitment by users and generally do not permit a single locker to be used by multiple users on an on-demand basis, or for a user to secure a bike at different locations.

Double mechanical lock systems (one individual user-supplied lock and one built-in lock which opens to any issued key) are successful in allowing multiple users access to all available lockers, but are successful overall only in situations where security among key-issued users is relatively high, such as within a company. These systems are not well suited to truly public settings, such as transit stations.

Most public storage lockers, whether on-demand lockers or long-term lockers, have inadequate security against vandalism, theft by breaking open the locker door, or jamming of the lock to an unlocked position. Typically, the latch mechanism, as well as the lock itself, is mounted on the door, in a manner that is not totally secure, leaving parts of the mechanism accessible when the door is open.

It is desirable for a public locker system to be set up for on-demand use, to be always locked except when unlocked for access, which is for only a few seconds, to be easily accessed by a key, preferably electronically, and to be visually open so as to preclude privacy, hiding or storage of unauthorized materials, and discourage unauthorized activities. These are objects of the invention described below.

SUMMARY OF THE INVENTION

These goals are addressed by the invention described below, wherein public storage lockers are designed particularly for storage of bicycles, such as at a public transportation terminal. In a preferred embodiment the storage lockers are on-demand, lockable by a user who must unlock the locker using the same electronic key (or PIN for a keypad, both of which may be referred to herein as "key device") and who must unlock the locker before using the key for any other locker. In the preferred embodiment, the lockers are visually open, with a secure screen or mesh on the locker door and optionally on walls and top cover. This reveals that the bike locker is occupied and prevents the use of the locker for unauthorized, privacy-requiring activities, or storage, or hiding of a bomb. Preferably the bike enclosure has a floor wheel guide for conveniently loading and unloading the bike and to maintain an orderly appearance.

A special door latch mechanism provides for security by including a latch bar in a fixed frame, while a latch bar lifter, operable to permit door opening when the lock is unlocked, is on the door. The door also has one or more angled, camming latch hooks, which penetrate the frame through slots to momentarily lift a spring-loaded or gravity-actuated latch member connected to the latch bar in a camming action when the door is closed. In another embodiment the camming latch on the door is permitted spring-loaded movement, camming over a surface of the latch bar when the door closes, and lifting clear of the larch hook when the latch bar is lifted in the unlocked mode. Thus, the door lock is always locked, in an available locked mode or an unavailable locked mode, except when unlocked for a only a few seconds before the lock automatically locks down the latch bar again, so the door is locked as soon as re-closed. LED indicator lights show whether the locker unit is in the available locked mode or the unavailable locked mode.

Preferably the electronic lock and keys have logic which prevents use of the key if the user fails to reopen the lock within a prescribed period of time, and other safeguards against user abuse.

In a specific embodiment the electronic keys are of the iButton type, which are merely touched to a designated spot on the lock in order to cause retraction of a bolt by a solenoid in the preferably battery-powered electronic lock, provided access criteria are met. If battery-powered, the lock enjoys a long battery life because the only mechanical movement performed in the lock is to retract a small bolt which normally blocks movement of the latch bar. The lifting of the latch bar and the opening of the door are performed manually by the user. The locks can be wired and powered externally if desired, facilitated by location of the lock in the frame (which is not possible in a secure and economical manner with the normal latch bar, lifter and lock in the door).

The cage is a heavy steel angle frame approximating the shape of a slice of pie in one preferred embodiment. Diagonal members on the sides can be added to provide additional strength and security. The cage can be bolted to the ground, to other cages side by side and/or to another cage stacked on top. Cages can be combined to create a partial or full circle, linear or sawtooth pattern. In a preferred embodiment, the cage also provides a secure enclosure for the automated elements. In the preferred embodiment, the cage design can support the installation of the automated elements in two different positions so that lockers can be stacked and the lock release mechanism is in reach for both upper and lower units.

The door is also constructed from a strong frame designed to be rigid against in- and out-of-plane bending when pried. It is attached to the cage with a hinge using a continuous piano hinge in the preferred embodiment. The door has rounded edges and fits into the surrounding cage frame, also with rounded edges, as it closes to prevent prying.

A secure enclosure is required to house the automated elements to prevent against tampering. A competing requirement is the infrequent requirement of accessing the automated elements for maintenance. These requirements are met by permitting access to the secure enclosure only when the Locker is open, and by using standard techniques such as cam locks in the preferred embodiment, tamper-proof screws, or a small hasp and lock to attach the access cover of the secure enclosure, accessible only from inside the locker.

In the preferred embodiment optimized for bicycle storage, a wheel guide bisects the bottom of the cage. Like wheel guides used in bicycle storage racks for retail stores, the open, re-entrant corners are oriented inward to accept the bicycle tire. This element facilitates loading and unloading a bicycle. It also creates a rugged surface on the floor that impedes using the cage as place to rest or sleep.

A heavy chain with vinyl cover and large ring may be attached to the frame in the locker for additional security. This enables the user to secure the bike frame and wheel(s) using the chain and a user-supplied bike lock fit into a large ring on the end of the chain.

The infill creates the walls of the cage and door. Expanded metal or mesh is attached to the frame, providing structural support and securing the contents while still allowing visibility into the cage. Alternatively, strong and secure transparent solid plastic sheets or virtually any other panel material having the required transparency can be used. Transparent sheets can be reinforced with glass fibers. In a preferred embodiment, additional interior members are added which would require a different tool to compromise, further impeding removal of contents even if the infill is compromised.

A powder-coated, galvanized or similar finish should be applied to the cage, door and infill for long term wear and weathering, or the cage can be constructed out of stainless steel. A weatherproof top can be used when the lockers are installed outside, without a secondary roof overhead.

The automated locking system is what allows the user to lock the door of the cage, and comprises both manually powered elements and automated elements. The automated elements control the user's ability to operate a secondary multi-point door latching system which secures the door to the cage.

In the preferred embodiment, the hardware that secures the door to the cage uses, in part, a standard multi-point latching system often found in wardrobe lockers. The user provides the power to open and close the latch using a pry- and push-protected handle. The automated elements control a bolt that enables and disables the latching system.

In one embodiment, rechargeable batteries provide power, supported by an external standard A/C line running a trickle charger. This allows the lockers to operate in the event of a power outage, and requires less maintenance than a battery-only system. An external port for a 9-volt DC power probe is provided that the lock can be operated by "jumping" power even when the batteries have expired or the supply system is down.

A communications port can be installed on the logic board of the electronic lock, to report activity and current status of all lockers. Depending on its intended use, the port can be installed to be accessed from the front of the unit, from the inside of the unit, from inside the secure steel box, or it can be wired directly to an external connection, such as a telephone line or a separate communications hub for a bank of lockers, so information or control of the lock mechanisms on all lockers can be accessed from a single location. Preferably the user is prevented by the electronics from using more than one locker at a time.

The locker is in a locked available mode or a locked unavailable mode at all times, except when momentarily unlocked, and the user has no power to extend the momentarily unlocked mode, which is only a few seconds. LEDs on the locker may operate to indicate status to users or potential users or to officials. For example, different colors can be used for different status (locked/available, locked/unavailable, expired usage period, out of order), or flashing or solid for different status. When the electronic key is touched to the electronic keypad on the lock, a solenoid or micro-motor retracts the lock bolt, allowing the user to lift the latch bar and open the door. The user then puts his bike inside the locker. The LED may flash as long as the lock is retracted. When the user closes the locker door, this status is indicated by the LED(s), indicating the locker is secured and in use. Once in this locked/unavailable mode, the locker can be opened once by the same user key. Once re-accessed, the lock reverts to the available mode, so indicated by LED.

If the locked/unavailable mode lasts for more than a certain period of time (such as, for example, one week for a bicycle locker), then the LED may so indicate, and a different electronic key is required to open the locker, the user's key being no longer effective, or to reset the lock allowing the user's key to work again. The different key may be in the hands of the police or a key-issuing agency, normally municipal or other government agency. This provides a deterrent to those who would monopolize lockers for long-term storage, as well as a mechanism for police or other officials to impound offending bikes, or to ticket offenders.

As noted above, the electronic lock can include a read/write memory capable of tracking usage of a locker, including blocking modes, and to report real time status of a large number of lockers, through wiring to a central facility or by telephone or other access.

A red LED mode (or another special mode) may be included on the lock, to indicate when the locker is out of order.

For security the door preferably is spring-loaded so as to be self-closing even if not deliberately closed by the user. Closing of the door is effective to cam and reset one or more latch members associated with the latch bar, securely locking the door.

Instead of being constructed in the way known prior art storage lockers, using sheet metal panels attached together, or molded materials, another important feature of this invention is that the infill panels are attached to a metal framework, allowing for greater flexibility in selecting transparent, translucent, opaque, metallic or non-metallic materials in any combination for the sides and top of the locker. The framework system also allows for flexible arrangement and ganging of the lockers without special party walls and/or end walls as are required in many bike locker systems.

It is thus among the objects of the invention to provide a conveniently used, highly secure, tamper-resistant and abuse-resistant on-demand or individually assigned locker, latch and lock mechanism, particularly adaptable for bicycle storage at a public transit facility. These and other objects, advantages and features of the invention will be apparent from the following description of a preferred embodiment, considered along with the accompanying drawings.

DESCRIPTION OF PREFERRED EMBODIMENTS

Figure 1:
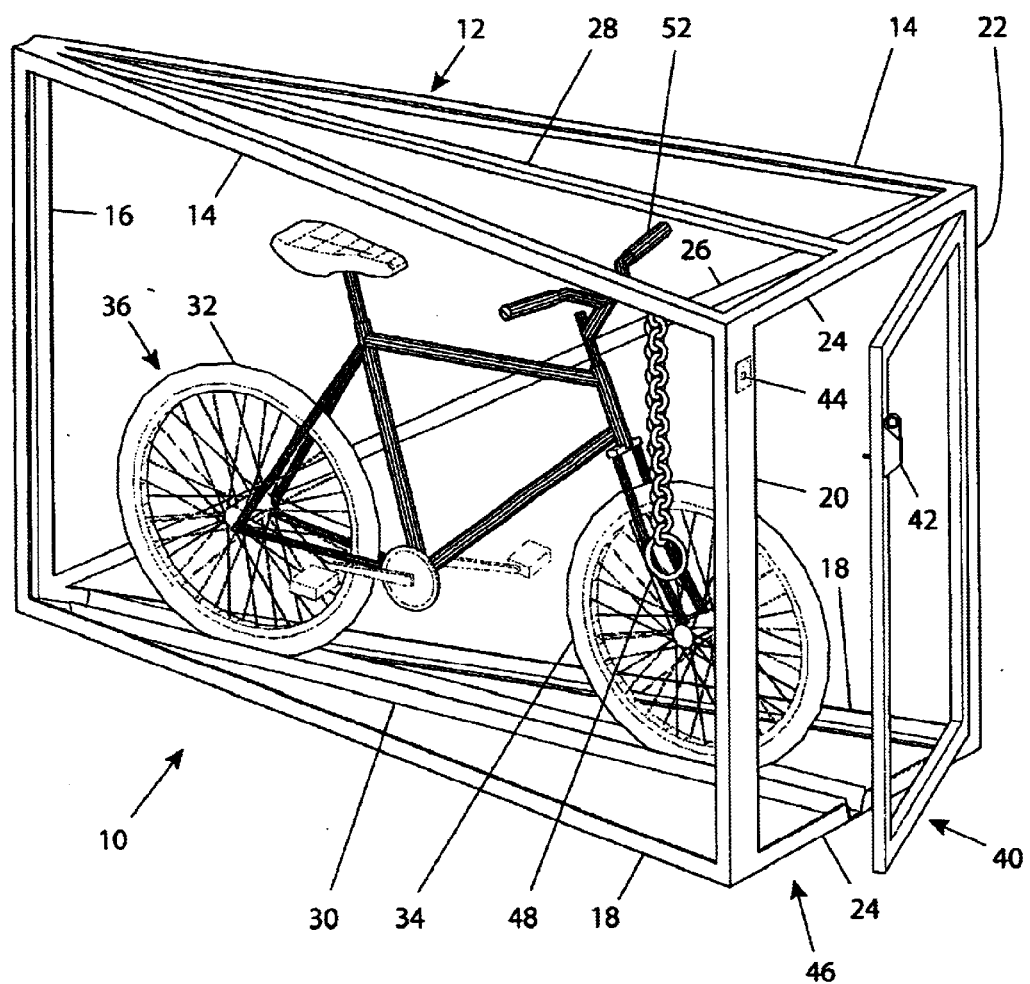
FIG. 1 is a perspective schematic view showing an embodiment of a bicycle locker according to the invention.

In the drawings, FIG. 1 shows a bicycle locker 10 according to a preferred embodiment of the invention. The locker 10 comprises an enclosure formed by a rigid frame 12 such as of steel or aluminum and preferably comprising angle members 14, 16, 18, 20, 22 and 24 as shown, with an access opening at the front of the enclosure. Additional structural members, particularly to rigidify and reinforce walls and roof of the structure, may be included at 26 (diagonal), 28 and 30. The member 30 preferably is in a V-shape or channel shape, to receive and guide the tires 32, 34 of a bicycle 36 schematically indicated as stored within the locker unit 10. The tire guide channel 30 helps guide the rear tire into a narrow rear portion of the preferably triangular-shaped enclosure, as well as holding the front wheel 34 in alignment while the bicycle is loaded.

The enclosure has a door 40 which is hinged at one side as shown, and with a handle 42 at an opposite edge of the door, for lifting when the lock has been successfully accessed. An electronic lock 44 preferably is positioned on the frame 46 around the door, the frame being comprised of members 20 and 24.

In FIG. 1 no infill is shown on the frame, and this infill may comprise a steel mesh, a strong plastic or fiber-reinforced mesh, sheets of rigid plastic or other appropriate secure material, preferably material which permits visibility into the unit. In one preferred embodiment, the door and at least one of the two sides of the unit have a transparent or translucent material as infill, allowing visibility into the unit for purposes of security and preventing undesired uses of the enclosure. More preferably, both sides, the door and the top all have this visibility-permitting material, allowing plenty of light into the unit.

An interior security chain 48 may be included, to enable a user of the locker to secure a lock to the bicycle frame for additional security.

Figure 2:
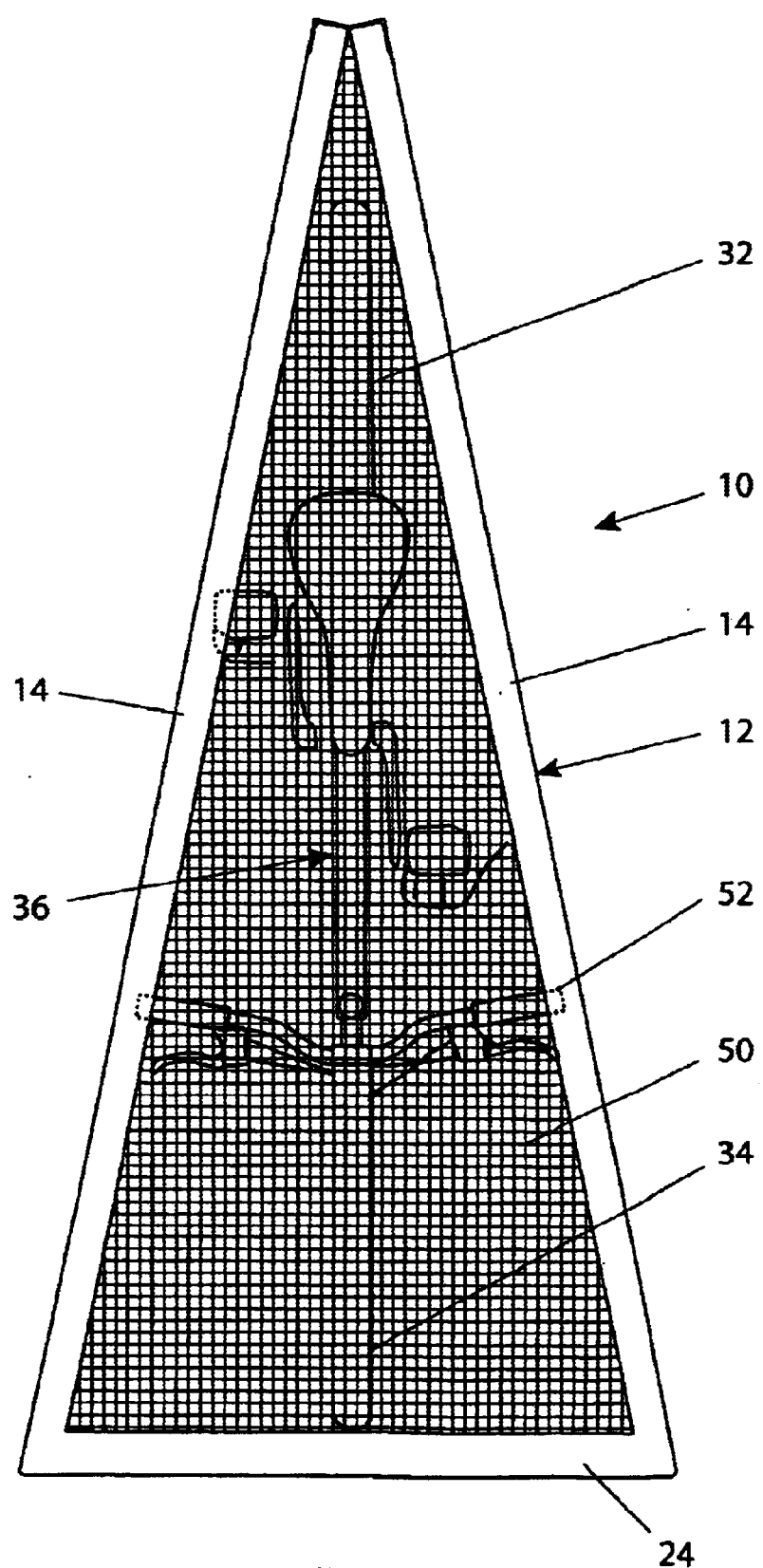
FIG. 2 is a plan view showing the bicycle locker of FIG. 1.

FIG. 2 shows a preferred embodiment of the locker in a top plan view. This view shows a secure wire mesh 50 used as the infill on the frame 12, preferably welded to the frame, but alternatively connected by secure bolts or other fasteners inaccessible from the outside of the storage unit 10. In FIG. 2 the bicycle 36 is seen to be visible from above, as is preferred, and the bicycle is aligned and neatly arranged within the storage unit, due primarily to the wheel guide 30 in which the tires reside. As shown, the bicycle's handlebars 52 may reach nearly to the side walls.

Figure 9:
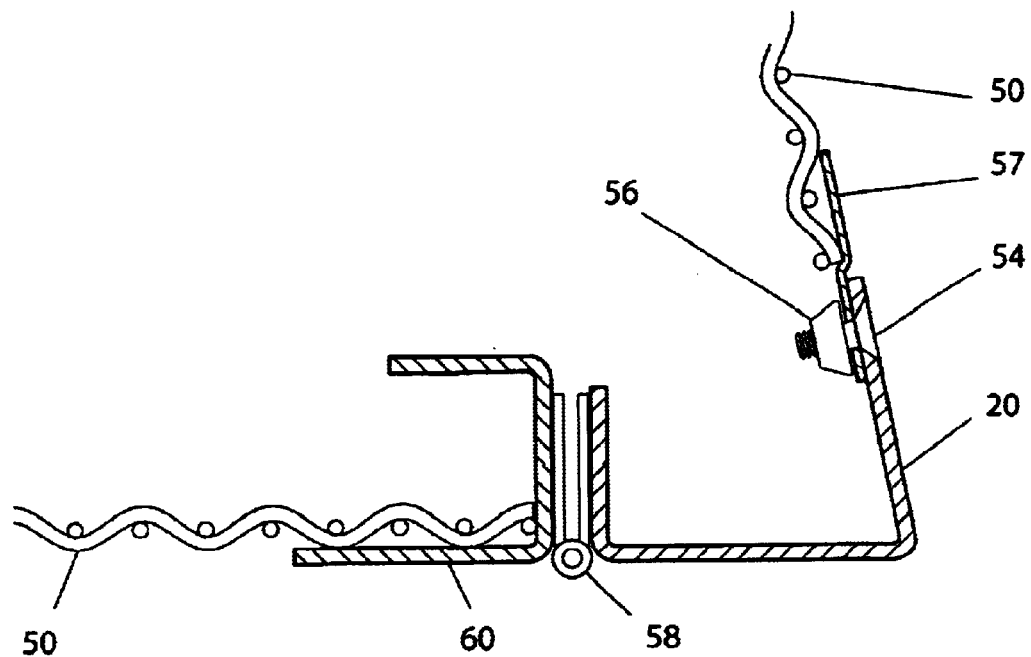
FIG. 9 is another sectional plan view showing a portion of the assembly.

FIGS. 3, 3A and 4–9 show details of a preferred form of latch mechanism for the storage unit, an important feature of the invention, as well as other constructional details. In FIG. 9 one manner of securing the infill mesh 50 to the frame is shown, with the hinged-side vertical frame member 20 shown in this particular view. The mesh (or other infill material) can be secured to the frame member 20 by a series of machine screws 54 with nuts 56, connecting to a metal margin piece 57 secured to the edge of the mesh preferably by welding. The machine screws, which may be 3/16" diameter stainless flat head countersunk machine screws, preferably have a secure head which is blank or requires a special tool to be engaged, or the nut 56 can be fixed to the screw threads sufficiently that the rotation of the screw head will simply rotate the nut and bolt together, preventing unauthorized disassembly. Alternatively, the mesh may be secured by welding or other secure mechanical means.

FIG. 9 also shows the door hinge 58, which preferably is a continuous hinge down the height of the door, heavy enough to be secure. The hinge 58 is attached as a butt hinge (as by welding or secure bolts or rivets) to the structural frame member 20 and to an edge channel 60 of the door, as shown. The door has similar infill material 50 to the walls and roof in the preferred embodiment.

Figure 4:
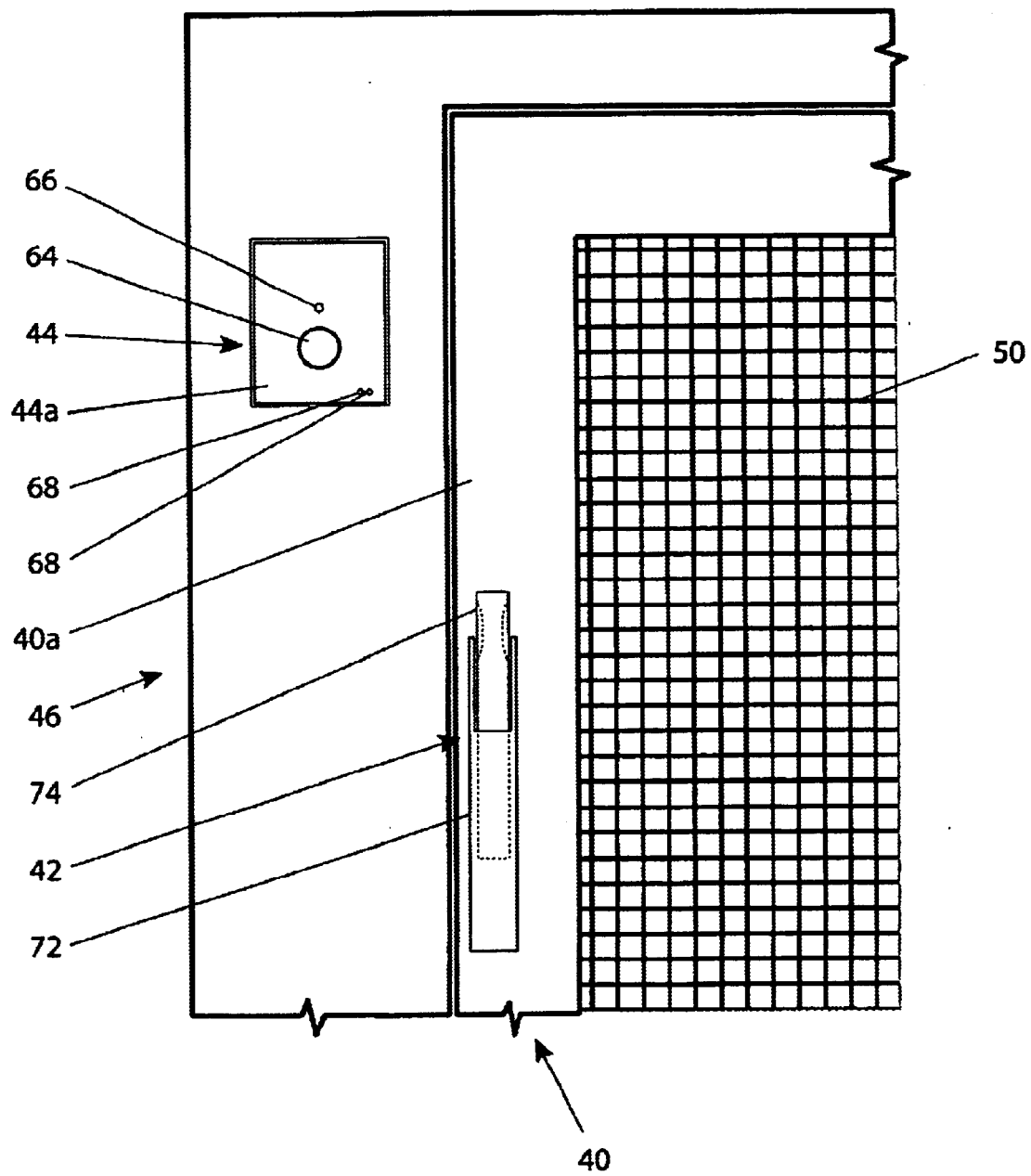
FIG. 4 is a partial view showing the front of the locker, showing an electronic lock in the frame, and showing a corner of the closed door.

FIG. 4 shows a portion of the front of the unit, at the upper left, revealing that in the preferred embodiment the door edge 40 fits flushly within the unit's front frame 46, for a clean appearance and for security against tampering. The lock for the door is shown generally at 44, and specifically a front plate 44a is seen in this figure. This may be an electronic lock with a contact pad 64 for touch-controlled access. Thus, an iButton or touch memory cell is used to access the lock, by contacting the iButton against the touch pad 64. In an alternative embodiment, the lock can have a keypad, such as an alphanumeric keypad, instead of being activated by touch memory. A mechanical lock could be used if desired. A multi-color LED 66 is shown for displaying colors as discussed above for an electronic lock, or this can be an LED with different flashing modes, indicating modes of operation to the user and to officials. The electronic lock unit 44 preferably also has external contacts 68 as discussed above, for "jumping" the lock with an external battery, such as a 9-volt battery, in the event power is out. This does not access the lock, but merely provides power so that the lock can be accessed with the appropriate iButton, or keypad entry.

The locker door handle is shown at 42, including a stationary portion 72 and, in the preferred embodiment, an upwardly slidable upper portion 74, which is slidable within the sleeve-shaped fixed portion 72. The sleeve configuration protects the movable handle from being pried or forced.

Figure 3:
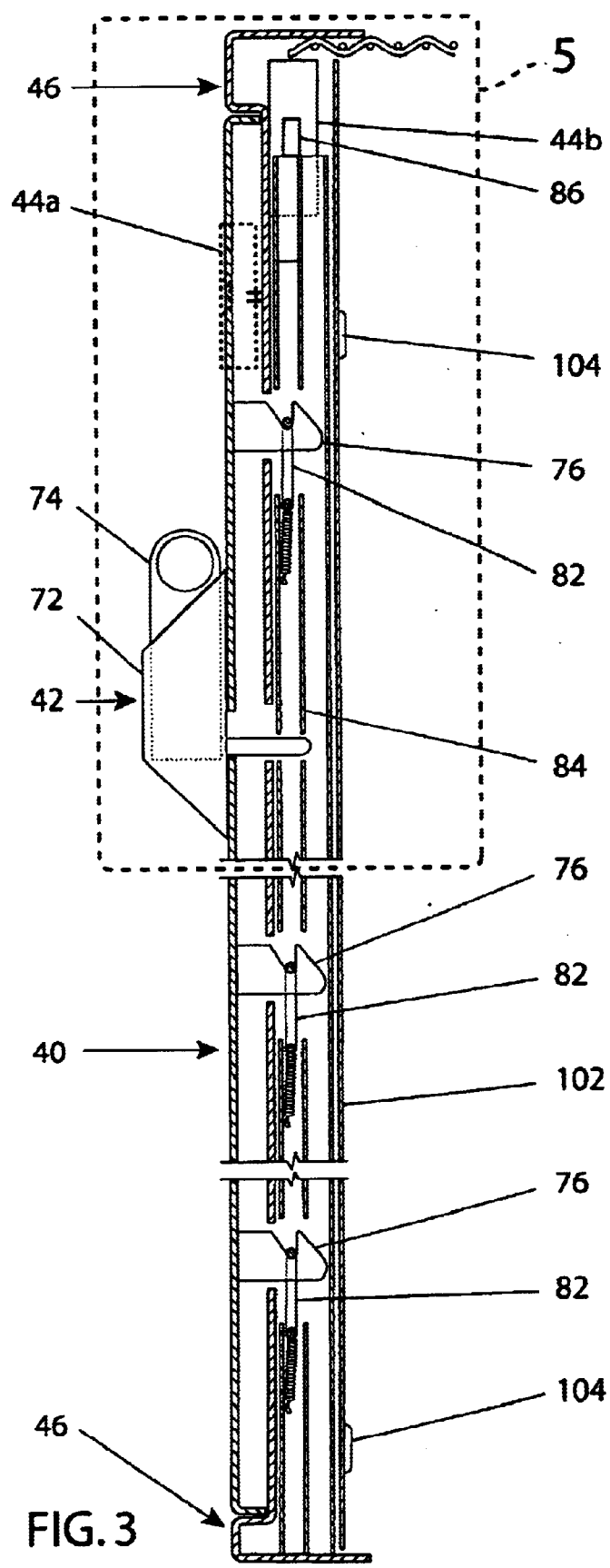
FIG. 3 is an elevational section view showing a latch mechanism of the locker.
Figure 3A:
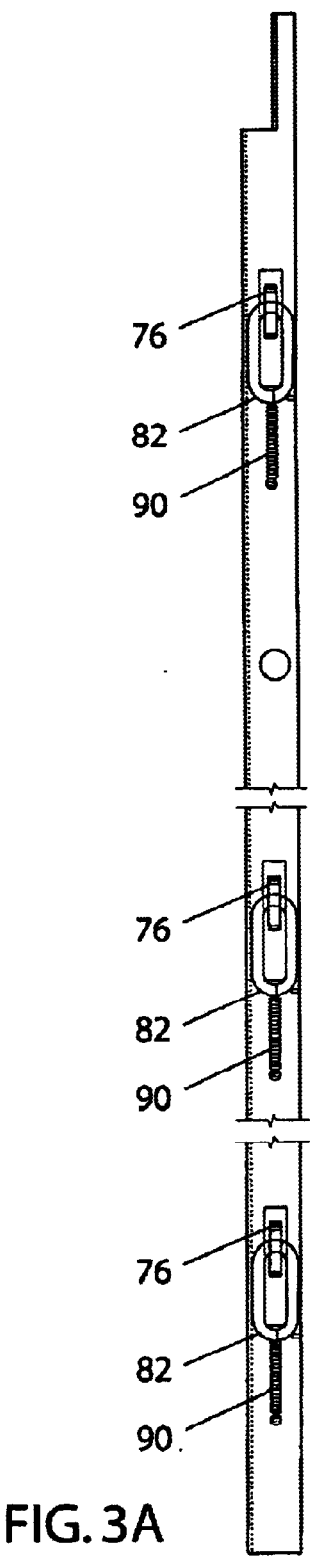
FIG. 3A is a view showing a latch bar of the lock mechanism, in an elevation at right angles to the view in FIG. 3.
Figure 5:
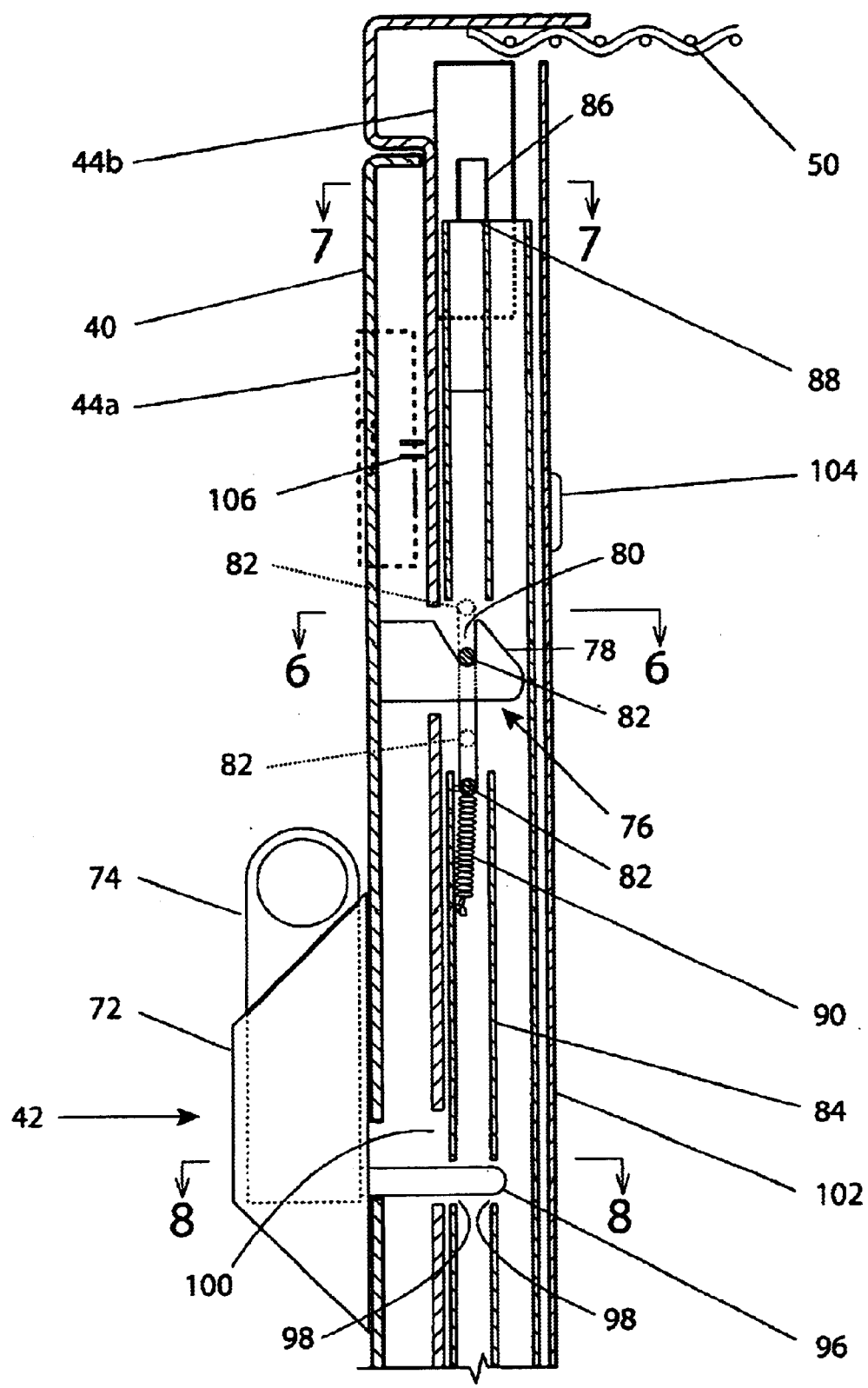
FIG. 5 is an enlarged view showing an upper portion of FIG. 3.

The door handle 42 is also seen in FIG. 3 and FIG. 5, and these should be viewed together in understanding the mechanism. FIG. 3 shows in elevational profile the door 40 as surrounded by the frame 46. The door includes, fixed to the door, at least one latch hook 76, and preferably three such latch hooks, as shown. These latch hooks, as better seen in FIG. 5, include a sloped back, forward end or ramp 78, adjacent to which is a notch 80 at the back edge of the sloped end, for receipt of a latch 82 which is inside the door frame. The latch 82 is connected to, or at least engaged by, a vertically-slidable latch bar or latch attachment 84 which extends at least most of the height of the door as shown. The latch bar 84 can extend to the bottom of the door frame as shown, and at its upper end it is normally blocked from upward movement by a retractable bolt 86 of the lock 44. When the bolt extends out, it blocks the lifting of the latch bar, by abutting directly against the upper end 88 of the latch bar or by entry of the bolt 86 into a notch or hole in the latch bar.

Figure 6:
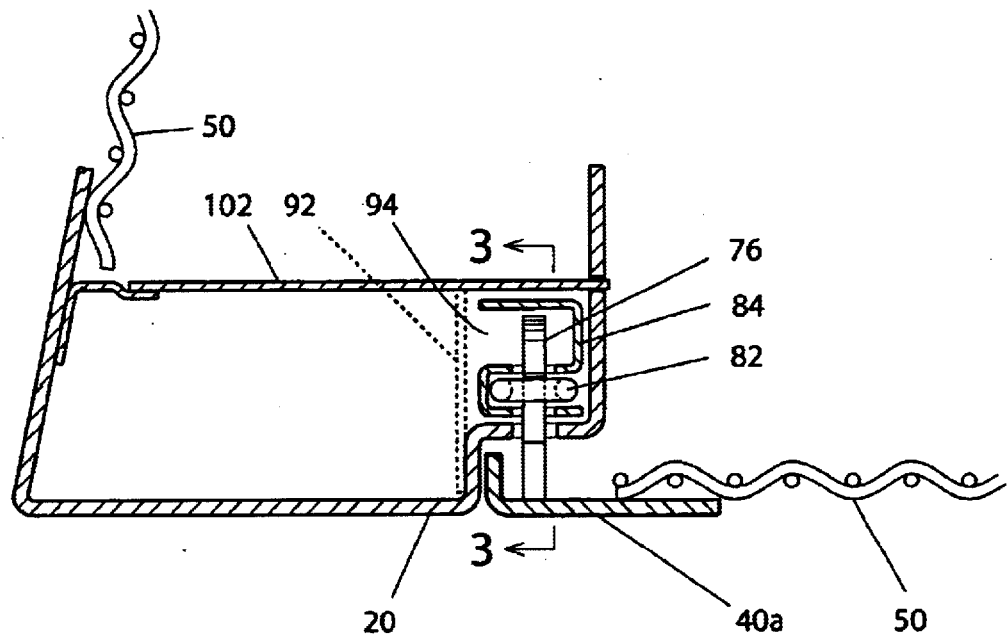
FIG. 6 is a sectional plan view showing a portion of the locker assembly.

Since it is desirable that the accessing of the lock only retracts the lock bolt 86 to the release mode momentarily, e.g. for a few seconds, it is preferable that the closure of the door be effective to latch the door in locked position automatically, without any further manual input and without requiring lifting of the latch bar, which is by this time locked to the down position shown. Therefore, the latch 82, which is cammed upwardly by the latch hook surface 78 as the door closes and then falls back into the latch hook notch 80 under the influence of a latch spring 90 (or by gravity, with a heavier latch member 82), is permitted movement independent of the latch bar 84. The latch member 82 is shown as an oval or racetrack-shaped chain link in the drawings, but it can take other appropriate configurations such as a horizontal bar contained within a slot in the latch bar and urged downwardly either by the tension spring 90 or by gravity. The latch member 82 is restricted as to downward movement by engagement with the latch bar, which lifts the latch member upwardly (to the extent of escaping the locking notch 80) as the latch bar is lifted. This restriction can be by any appropriate seat on the latch bar for engaging the latch member, or any appropriate projection of the latch bar which engages the latch member in one direction, preventing down movement of the latch member relative to the latch bar. FIG. 6 shows the latch member 82 as contained within a fold or pocket of the latch bar 84, which preferably is S-shaped in cross section as shown. The latch member 82 is nested within the latch bar and can be supported against downward movement in the latch bar by an appropriate form of ledge or projection below the latch member. FIG. 6 also shows the latch hook 76 fixed (as by welding) to the door edge 40a through the frame member or jamb 20, into the interior of the frame and through the latch bar 84, intercepting and engaging with the latch member 82. FIG. 6 also shows in dashed lines a vertically oriented latch bar restraint 92 that retains the vertically slidable latch bar within a pocket 94 of the frame.

The door handle 42 operates in a manner which provides for maximum security. Instead of being located on or inside the door, as is typical, the vertically slidable latch bar 84 is secured within the door jamb or frame member 20 as explained above. The handle 42 needs to be capable of engaging and lifting this latch bar, but only for initially releasing the latch hooks 76 from the latch members 82. Once the door is free of the latch, the latch bar can be returned to its normal, down position. For this purpose, the movable part 74 of the handle 42 is fixed to a latch bar lifter or latch bar shifter 96 which extends into the frame and into holes 98 in the latch bar itself, as seen particularly in FIGS. 5 and 8. The frame member 20 has a vertically elongated slot 100 through which the latch bar lifter 96 passes, allowing it free up-and-down movement relative to the frame.

Thus, when the lock 44 is successfully accessed, causing the lock bolt 86 to retract to the release mode, at that instant the user is permitted to pull upwardly on the upper, release portion 74 of the handle and thus to lift the latch bar shifter 96. This lifts the latch bar, which in turn lifts the latch member 82 as explained above. Thus, with the handle portion 74 held upwardly for a second or even a fraction of a second, the user pulls the door open, clearing the latch hook 76 from the latch 82. As this is accomplished, the latch bar lifter 96 pulls away from the latch bar 84 allowing the latch bar to drop back to its down position. All this takes places within a few seconds, or even less than a second, and the lock bolt 86 extends back outwardly to its locked position, preferably by spring force or timed delay (as with a double-acting solenoid). Thus, the actual retraction of the lock bolt can be for only about one second, or it can be two to four seconds to assure that the user has plenty of time to open the door. Once the latch bar is lifted, even if the lock bolt tries to re-extend (by spring force) it will merely be delayed until the latch bar drops.

After the door is opened, the latch mechanism is essentially locked. The latch bar shifter is preferably short enough that the latch bar drops back to normal position even before the door edge is fully clear of the frame, preventing insertion of a tool to hold the bar in the up position.

Closing of the door will effect the upward camming of the latch member by the latch hook ramp 78 to relatch the door in the closed, locked position.

Figure 5A:
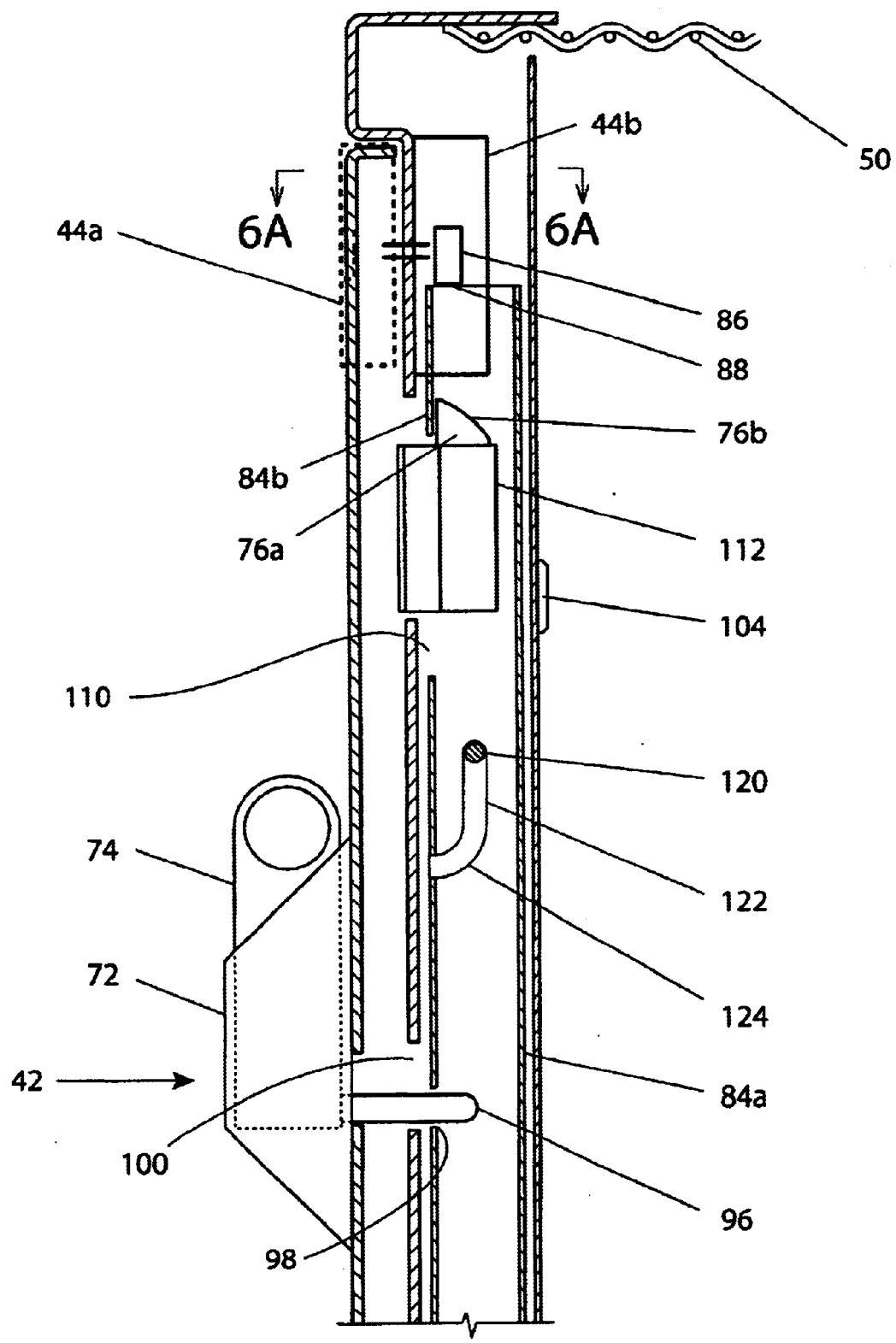
FIG. 5A is a view similar to FIG. 5 but showing a modified latch embodiment.
Figure 6A:
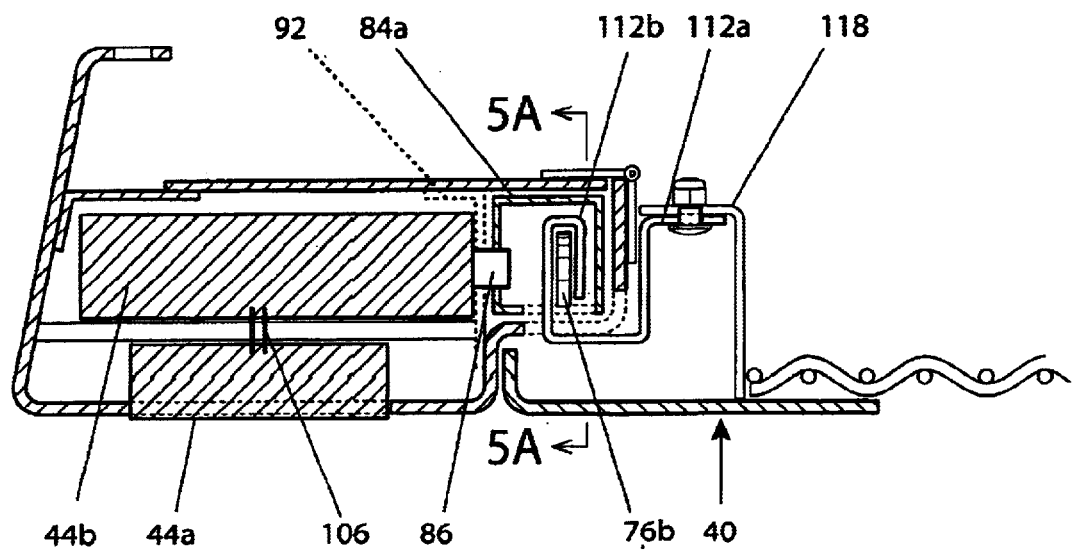
FIG. 6A is a view similar to FIG. 6 but showing the embodiment of FIG. 5A.
Figure 6B:
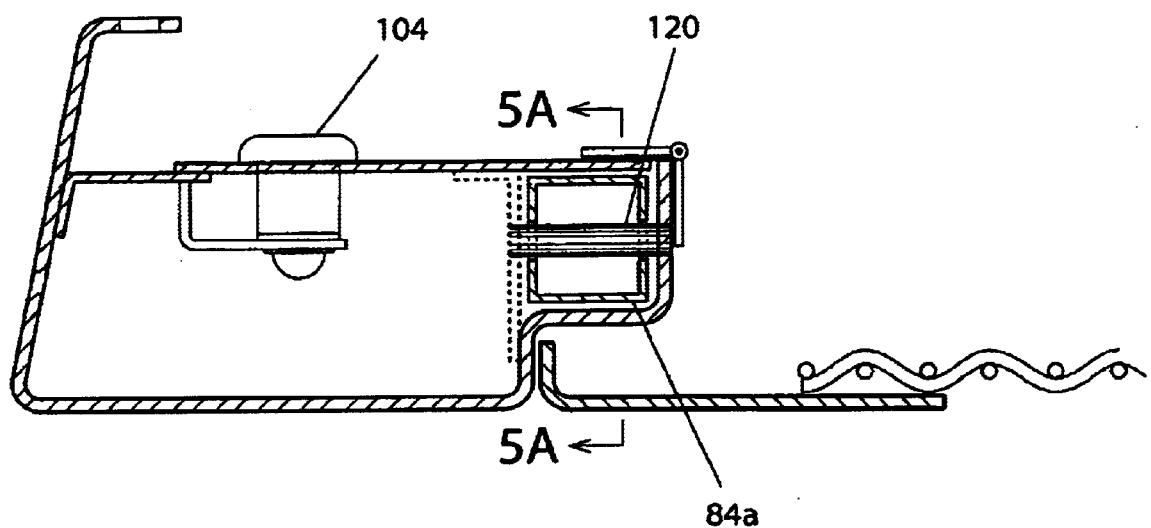
FIG. 6B is another similar section view, taken lower in the assembly.
Figure 6C:
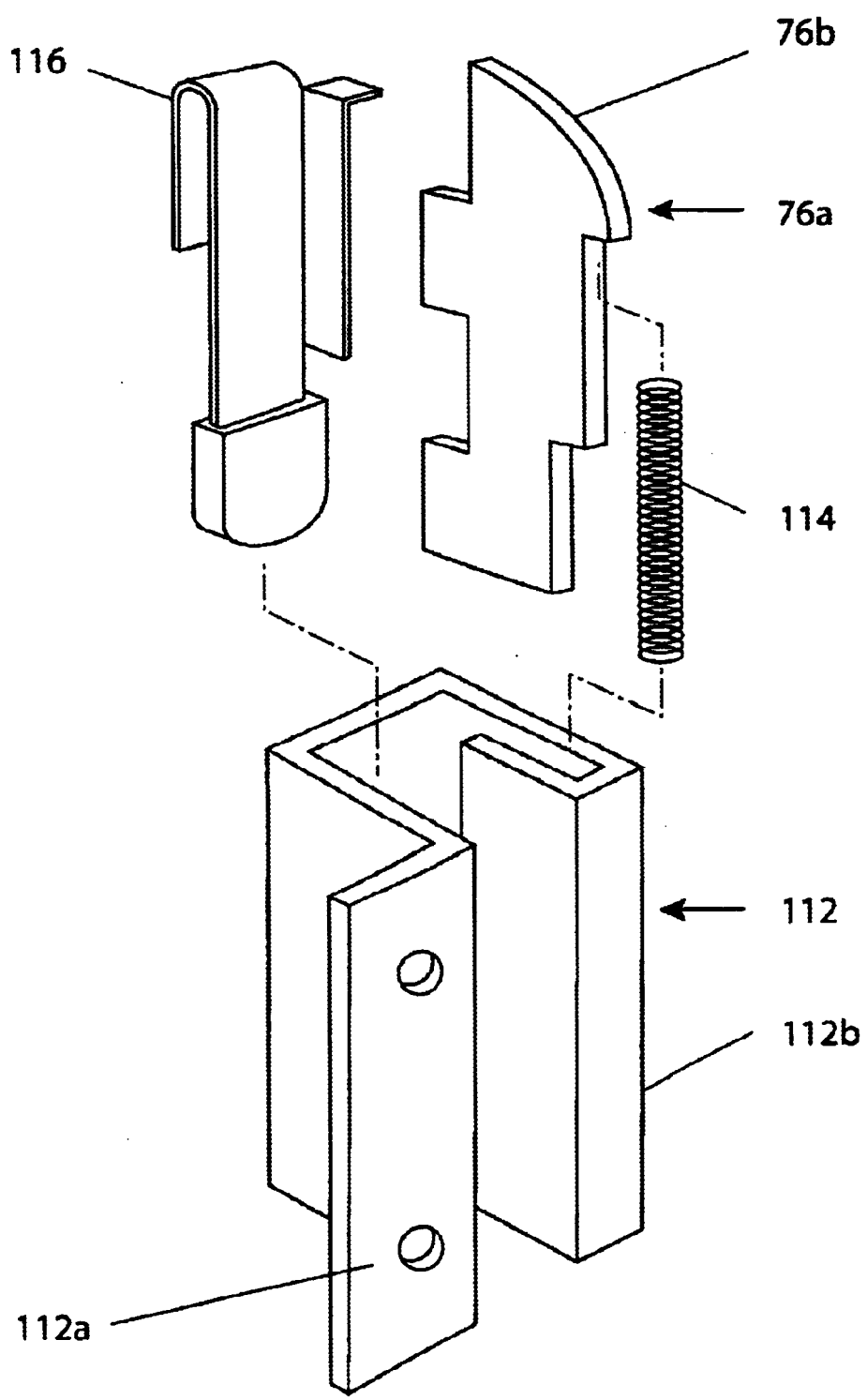
FIG. 6C is an exploded perspective view showing a latch unit included in the arrangement of FIGS. 5A and 6A.
Figure 8:
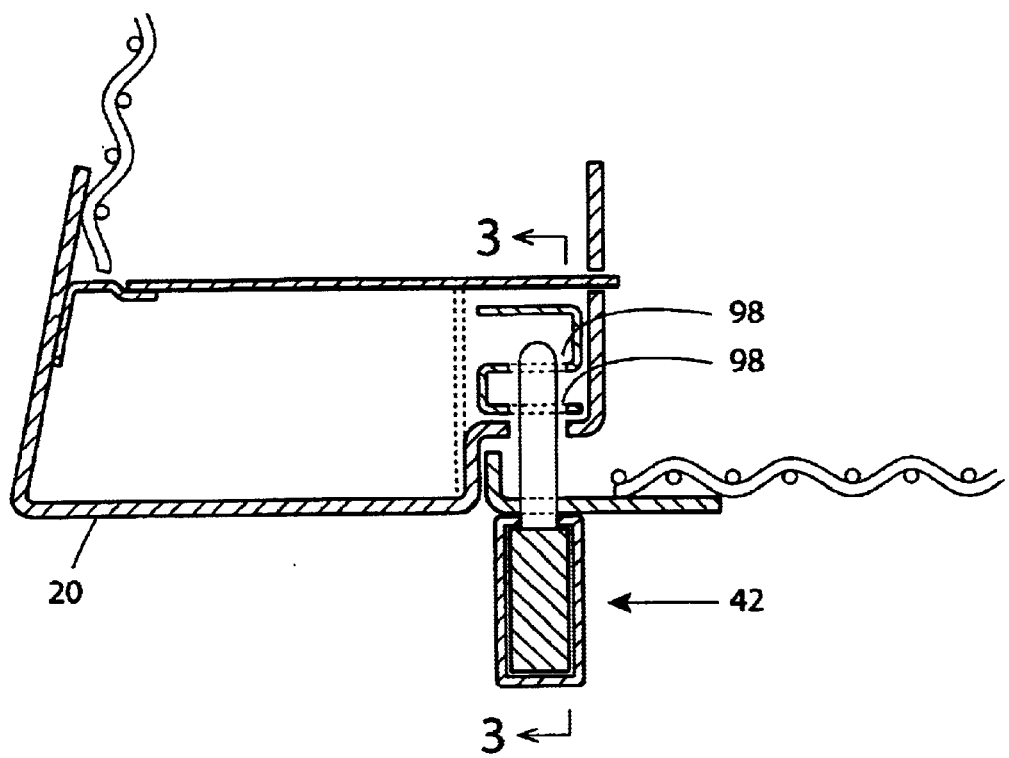
FIG. 8 is another sectional plan view showing a portion of the assembly.

FIGS. 5A, 6A, 6B and 6C show a modified embodiment of the invention wherein the automatic latching of the door upon closure is accommodated by movement in the latch hook (connected to the door) rather than movement of the latch member (contained within the frame). Here, the latch bar 84a has a slotted opening 110 (and the frame has an adjacent opening) through which extends a housing 112 for the latch hook 76a, which in this case comprises a vertically reciprocable plunger. The plunger and housing assembly are shown in FIG. 6C, indicating that the housing is a folded component, preferably of metal, within which the plunger 76a is slidable, biased upwardly by a compression spring 114. A jamb clip 116 fits within the housing 112 and retains the plunger in the housing, within the limits of its range of motion. This plunger and housing assembly is a locker part sold by Worley, such as available at ROBERTBROOKE.COM, part number 530100.

The housing as mounted to the door 40 is shown in FIG. 6A. A mounting flange 112a is secured to a bracket 118 at the inside of the door, and the folded-over portion 112b extends into the frame, as shown. FIG. 6A shows the sloped-back upper end 76b of the latch hook or plunger 76a. The latch bar is indicated at 84a, in this case preferably a rectangular latch bar having an interior within which the plunger 76a and folded-over portion 112b of the plunger housing can fit.

FIG. 5A shows that the door is latched by positioning of the plunger or latch hook 76a at its extended position behind a wall 84b of the latch bar. As the door is closed, the sloped-back forward and upper surface 76b of the plunger engages the bottom edge of the wall or plate 84b of the latch bar, camming the plunger downwardly into the housing, against the force of the compression spring 114. Once the door is sufficiently closed that the plunger clears the latch bar wall 84b, the plunger springs upwardly to its normal and extended position, latching the door closed. When access is granted via the lock, with retraction of the lock bolt 86, however, the latch bar is permitted upward movement by the user's pulling upwardly on the handle 74. The latch bar opening 110 has sufficient space below the plunger housing 112 to allow the latch bar to be lifted such that the plate or wall 84b is clear of the extended plunger 76a, i.e. the opening 110 has been shifted to clear the plunger for opening of the door.

FIGS. 5A and 6B also show a rod 120 which is included in a preferred embodiment, fixed to the frame and supporting the latch bar for vertical sliding movement. FIG. 5A shows a groove 122, formed in parallel at both sides of the latch bar, which travels over the rod 120. The groove is shown with a J-shaped lower end 124 for initial assembly into the frame.

Figure 7:
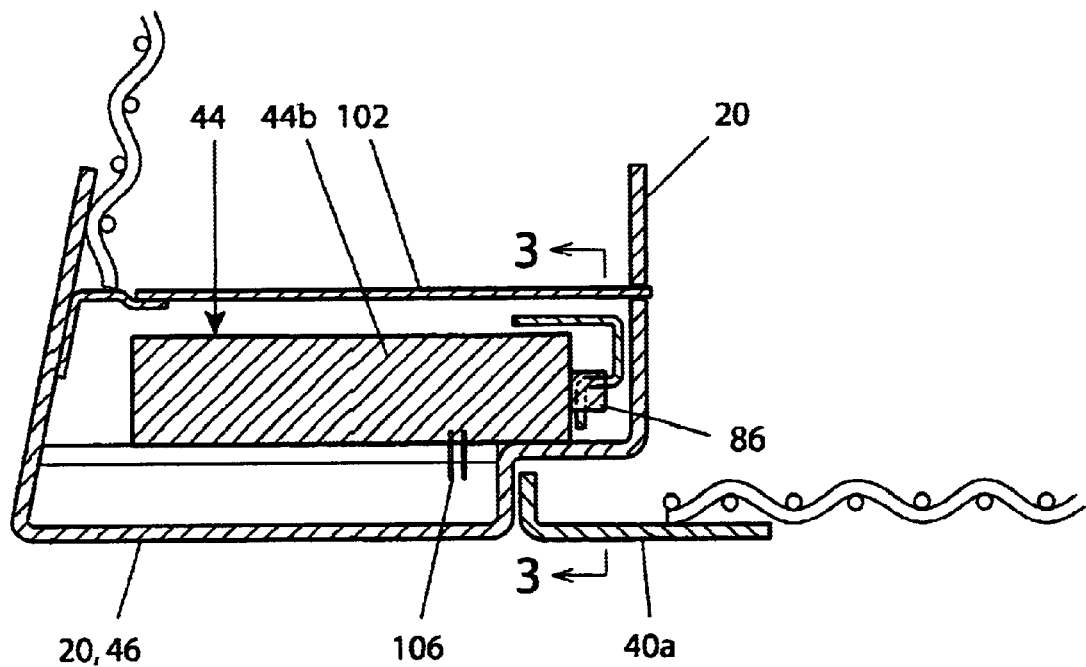
FIG. 7 is another sectional plan view showing a portion of the assembly.

FIG. 7 is a top plan sectional view at the lock 44. This view shows some aspects of security of the system, in which access to the lock 44 is not permitted the user even from the inside of the enclosure, when the door is open. The lock, if electronic, may be in two components: the front plate 44a seen in FIG. 4, and the lock mechanism 44b with retractable bolt 86 as seen in FIG. 7. A security plate 102 is connected into the frame member 20 and preferably locked in place, as by keyed cam locks at appropriate locations on the inside of the frame. This security plate may extend the full height of the frame member 20 if desired, or it can be in separate sections. In any event, as seen in FIG. 3, this plate also protects the frame 46 from being accessed at the locations of the latch members 82, which may be at three different locations in the frame as shown in FIG. 3. FIG. 3 indicates two different locks 104 provided to secure the security plate 102 in place. Alternatively, secure fasteners requiring a special tool could be used.

FIG. 7 also indicates an electrical cable 106 extending from the rear lock component 44b. This connects to the front lock plate 44a, not seen in FIG. 7. An additional cable (not shown) can extend from the lock for providing audit and current status information for all units, since the electronic lock preferably has microcontroller and memory, recording access events. Power wires may also be desired. The invention makes this wiring possible in a secure way, since the electronic lock is located in the fixed frame rather than in the door, where a cable would have to pass from the frame to the door, most likely exposing the cable to tampering or vandalism.

The invention allows opening of the door with one hand after the lock is released. Although the accessing handle could be on the frame instead of the door, this would require two hands to open the door.

The invention is described with a vertically slidable latch bar that falls by gravity to its normal, locking position, but the normal position could alternatively be an upper position, biased by a spring. The latch hooks, latch members, latch bar shifter, lock, etc. would still function similarly except in requiring a down motion to shift the latch bar permitting the door to open.

Although the invention is described above in its preferred embodiment with a vertically slidable latch bar, parallel to a vertical-axis hinge arrangement for the door, the important principles of the invention also apply to other arrangements. For example, the hinge could be on a horizontal axis for some applications such as where space or convenience require this, and the latch bar could be a horizontally slidable latch, thus being parallel to the hinge axis, biased to a normal, locked position by a spring and movable against the spring when the lock is in release mode; references herein and in the claims to lifting, up, down, above, below, etc. are not to be taken as limiting in this regard but only as indicating relative positions and movements. Still further, instead of an elongated latch bar this element could simply comprise a movable latch element, which could be shorter and still slidable, or which could be a rotatable latch element. In any event, the latch element is contained securely within the door frame and preferably it is not movable to its release position except when the lock is in release mode and the door is closed, putting in operative position a latch element mover or shifter which could be a rotational component extending into the frame from the door, rather than a slidable latch element shifter as disclosed above, co-acting with a slidable latch element. With the lock, movable latch element and latch member or members contained within the frame and inaccessible to vandals or to the user even when the door is open, the latch mechanism of the invention in any of the above forms provides distinct advantages and heightened security in a mechanism which is still relatively simple in construction.

An alternative embodiment of the invention still includes the two locked modes—available locked and unavailable locked—but eliminates the latch mechanism. In such form the lockers have electronic locks that are always in locked mode when the doors are closed. This can be with electrically retractable spring latches or electrically movable bolts that sense door closure and extend upon closure. Multiple bolt or latch points can be included. Generally, in a battery-powered system for large lockers such as bicycle lockers, the mechanical latch (controlled by electronic lock) is preferred, so that the user moves relatively heavy latch components and only a lightweight bolt is moved electrically.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A locker with a door and latch, comprising:

a locker enclosure, a door frame outlining an access opening, a locker door pivotally connected along a pivot axis to the frame at one edge, along a vertical axis, and configured to close adjacent to the frame, a door edge opposite the pivot axis with a movable handle near the door edge, mounted on the door for movement by a user to access the locker when permitted, a generally vertically oriented latch bar coupled to the frame, with means for urging the latch bar toward a normal position, a lock mounted in the frame, generally adjacent to the latch bar, the lock being effective to prevent vertical movement of the latch bar except when the lock is accessed to a release mode, a latch hook secured to the door near said opposite edge, with an angled, sloped-back forward edge and with a back edge opposite the sloped edge such that a high point is defined between the sloped-back forward edge and the back edge, for receiving a latch member against said back edge and preventing opening of the door, and an opening in the frame for entry of the latch hook as the door is closed, a latch member within the frame, positioned to be engaged by the latch hook when the door is closed, and cam means acting between the latch hook and the latch member for camming the latch hook's forward edge over the latch member such that one of the latch hook and the latch member moves as the latch member slides over the latch hook's forward edge to accommodate closure of the door until the latch member passes over said high point and reaches said back edge of the latch hook, with means for urging the relative positions of the latch member and latch hook such that the latch member engages against said back edge of the latch hook to latch the door closed, means on the latch bar for moving the latch member clear of the latch hook when the lock is accessed and the latch bar is moved, thus permitting opening of the door, and the handle having a connected latch bar shifter which extends into the frame when the door is closed and which engages with the latch bar and is effective to shift the position of the latch bar to release the latch member when the handle is moved, as permitted by accessing of the lock.

2. The apparatus of claim 1, wherein the latch bar has a normal lower position, retained by gravity as said means for urging the latch bar, with the lock normally preventing lifting of the latch bar, and wherein the handle has a normal lower position and is permitted upward sliding movement when the lock is accessed, allowing the handle, latch bar shifter and latch bar to be lifted upwardly to lift the latch member clear of the latch hook, whereby the latch bar shifter pulls away from and disengages from the latch bar as the door is opened, and the latch bar drops by gravity back to the normal lower position.

3. The apparatus of claim 2, wherein the lock has a slidable bolt normally engaging adjacent to the latch bar to prevent lifting of the latch bar except when the blocking member is retracted by successfully accessing the lock.

4. The apparatus of claim 1, wherein the locker door is configured to close into a space surrounded by the frame such that the door and frame surfaces are essentially flush at the outside of the locker when closed.

5. The apparatus of claim 4, wherein the latch bar shifter is of a limited length such that it is adapted to pull away from and disengage from the latch bar, allowing the latch bar to return to normal position essentially before said opposite door edge moves fully out from the surrounding frame.

6. The apparatus of claim 1, wherein the frame encases the latch bar, lock and latch member so as to render them inaccessible to a user even when the door is open.

7. The apparatus of claim 1, wherein a plurality of latch hooks and latch members are included, at vertically spaced locations along the latch bar.

8. The apparatus of claim 1, wherein the latch member is positioned generally within the latch bar.

9. The apparatus of claim 1, wherein the latch hook comprises a reciprocal plunger having said sloped back forward edge, and including a jamb housing within which the plunger is reciprocal, with a retention device within the jamb housing urging the plunger in a direction effective to latch the door when the door is closed, and the latch member comprising a member fixed to the latch bar.

10. The apparatus of claim 1, wherein the latch member is mounted to permit movement in the frame, and said means for urging is also operative to urge the latch member toward a position to latch the door when the door is closed, and the latch hook being fixedly secured to the door.

11. The apparatus of claim 1, wherein the means for urging comprises a compression spring.

12. The apparatus of claim 1, wherein the frame encases the latch bar, lock and latch member so as to render them inaccessible to a user even when the door is open, the frame including an inner side with an access panel secured over the latch bar, lock and latch member, with locking means for returning the access panel in place.

13. The apparatus of claim 1, wherein the locker enclosure comprises a locker frame defining a shape for the locker, including walls and a roof, and infill material secured to the locker frame to form the enclosure.

14. The apparatus of claim 13, wherein the infill material is translucent so as to allow at least some light through and to permit visual observation of the interior of the enclosure.

15. The apparatus of claim 14, wherein the locker door includes said infill material.

16. The apparatus of claim 14, wherein the infill material comprises a metal mesh.

17. The apparatus of claim 14, wherein the infill material comprises at least one of a transparent material and a translucent material.

18. The apparatus of claim 14, wherein the locker enclosure is of a shape and size to store a bicycle with the front of the bicycle oriented toward the door.

19. The apparatus of claim 1, wherein the locker enclosure is of a shape and size to store a bicycle with the front of the bicycle oriented toward the door.

20. The apparatus of claim 19, wherein the locker enclosure is generally triangular.

21. The apparatus of claim 1, wherein the lock comprises an electronic lock.

22. The apparatus of claim 1, wherein the means on the latch bar for moving the latch member comprises the latch member being fixed to the latch bar.

23. A locker with a door and latch, comprising:

a locker enclosure, a door frame outlining an access opening, a locker door pivotally connected along a pivot axis to the frame at one edge, and configured to close adjacent to the frame, a door edge opposite the pivot axis with a movable handle near the door edge, mounted on the door for movement by a user to access the locker when permitted, a movable latch element within the frame, with means urging the movable latch element toward a normal position, a lock mounted in the frame, generally adjacent to the movable latch element, the lock being effective to prevent movement of the latch element from its normal position except when the lock is accessed to a release mode, a latch hook secured to the door near said opposite edge, with an angled, sloped-back forward edge and the latch hook being mounted on the door for reciprocal movement toward and away from a latching position and being biased toward the latching position, and the latch hook having a back edge opposite the sloped edge for receiving a latch member engaged against the back edge so as to prevent opening of the door, and an opening in the frame for entry of the latch hook as the door is closed, a latch member within the frame, fixed to the latch element and positioned to be engaged by the latch hook when the door is closed and to cam over the sloped edge as the door is closed such that the latch hook is cammed away from the latching position until it passes the latch member and returns to the latching position engaging the back edge of the latch hook against the latch member, so that as the door is closed it briefly cams and shifts the latch hook until the latch hook snaps back, engaged with the back edge of the latch hook, the latch element being effective when the movable latch element is moved to move the latch member clear of the latch hook, thus permitting opening of the door, and the handle coupled to a latch element shifter which extends into the frame when the door is closed and which engages with the movable latch element and is effective to shift the position of the movable latch element to release the latch member when the handle is moved, as permitted by accessing of the lock.

24. A system of on-demand public storage lockers, comprising:

a series of storage lockers which are locked whenever closed, each said locker having a door and an electronic lock for the door having two locked modes including an available locked mode and an unavailable locked mode, a series of key devices for accessing the electronic locks of the lockers, each key device being unique and being capable of accessing any of the electronic locks, such that a personal key device can be issued to each of a number of persons to be permitted access to all of the storage lockers, and each electronic lock having means for storing the unique code of a user's key device when opened from the available locked mode, for entering the unavailable locked mode, for allowing re-accessing of that lock by the same user at a later time, and for preventing access to that lock by any other user's personal key device prior to re-accessing by the same user.

25. The system of claim 24, further including means in the system for preventing a user with a personal key device from using more than one storage locker in the system at one time.

26. The system of claim 24, further including means associated with each electronic lock for limiting the duration of the unavailable locked mode, and preventing re-accessing of the lock in the unavailable locked mode by said same user after expiration of a preselected period of time.

27. The system of claim 24, further including LEDs connected to each electronic lock, indicating status as unavailable locked mode or available locked mode.

28. The system of claim 24, in combination with a mechanical latch mechanism associated with each door, the latch mechanism being biased to a latched position and the door being-biased toward closure such that the open door when released closes and latches to the locked mode.

29. The system of claim 24, wherein the series of storage lockers comprises at least one bicycle locker.

30. The system of claim 24, wherein re-accessing a locker in the locked unavailable mode returns the locker to the available locked mode.

31. A locker comprising:

a security device, comprising, an electronic controller configured to produce signals identifying a control state comprising one of a locked and available state, a locked and unavailable state, and an unlocked state, and a plurality of user access keys directly operable with the electronic controller, wherein the electronic controller is further configured to, allow any of the plurality of user access keys to change the control state from the locked and available state to the unlocked state, and only allow a last used of the user access keys to change the control state from the locked and unavailable state to the unlocked state;

an access door;

a locking mechanism engagable with the access door and configured to secure the door when engaged; and wherein:

the control state signals produced by the electronic controller are coupled to the locking mechanism; and the security device maintains the access door, via the locking mechanism, in one of a locked and available state, a locked and unavailable state, and an unlocked state according to the control state signals.

32. The locker according to claim 31, wherein the electronic controller is further configured to place the control state in the locked and available state immediately after being in the unlocked state.

33. The locker according to claim 31, wherein the locking mechanism is mounted in a frame area around the access door.

34. The locker according to claim 31, wherein:

the access door comprises a latch, a lifter, and a lift actuator coupled to the lifter; and the locking mechanism comprises, a latchbar configured to be engagable the door latch, and a bolt moveable to each of a first position that allows movement of the latchbar and a second position that prevents movement of the latchbar.

35. The locker according to claim 34, wherein:

the access door further comprises a lifter; and the lifter is configured to disengage the locking bar from the door latch when the lifter is moved and the bolt is in the first position.

36. The locker according to claim 34, wherein the access door comprises a camming surface configured to move the latchbar into engagement with the door latch.

37. The locker according to claim 31, wherein the locker is a public storage locker.

38. The locker according to claim 31, wherein the locker is a bike locker.

39. The locker according to claim 31, wherein the locker is a bicycle locker installed at a public transportation station.

40. A storage locker, comprising:

access means for accessing the storage locker;

securing means for securing the storage locker access means; and state means for determining a current state and for placing and maintaining the securing means in the current state;

wherein:

the securing means includes a set of user states comprising a locked and available state, a locked and unavailable state, and an unlocked state;

the current state comprises one of the user states; and the locked and available state comprises a state where the access means is secured but the locker is available for use to a limited pool of users having a key for changing the state.

41. The storage locker according to claim 40, wherein:

the access means comprises, a door having a latch means, a movable handle attached to the door, and a disengagement means coupled to the movable door handle;

the storage locker further comprising a door frame means surrounding at least part of the door;

the securing means comprises, a slidable engagement means disposed in the door frame means and configured to be engagable with the latch means, a block means disposed in the door frame means and having a first position that allows movement of the slidable engagement means and a second position that blocks movement of the slidable engagement means, and an actuation device disposed in the door frame means for moving the block means into at least one of the first and second positions according to the current state; wherein:

when the slidable engagement means is engaged with the door latch and the blocking means is in the second position, the storage locker door is secured; and the disengagement means is configured to disengage the slidable engagement means upon movement of the moveable handle when the blocking means is in the first position.

42. The storage locker according to claim 40, further comprising:

a plurality of user access keys operable with the state means; wherein:

the state means is configured to, allow any of the plurality of user access keys to change the control state from the locked and available state to the unlocked state, and only allow a last used of the user access keys to change the control state from the locked and unavailable state to the unlocked state.

43. The storage locker according to claim 42, wherein the storage locker is a bicycle locker.

44. The storage locker according to claim 40, wherein the state means returns the current state to the locked and available state immediately following the unlocked state.

45. The locker according to claim 31, wherein the electronic controller is further configured to change state from the locked and available state to the unlocked state immediately upon accessing the control device with one of a plurality of user access keys.

46. The locker according to claim 45, wherein the electronic controller is further configured to change state from the unlocked state, after having immediately and precedingly been in the locked and available state, upon opening of the access door, such that when the access door is closed, the locker is secured in the locked and available state.

47. The locker according to claim 42, wherein:

the locked and available state comprises a state where the locker is selectable and available to any of a limited pool of users;

the state means is further configured to change the current state of the state means from the locked and available state to the unlocked state only when the locker is specifically selected by a user.

48. A locker comprising:

a door;

a frame surrounding at least part of the door;

a latchbar movably coupled to the frame and engageable with the door;

means for shifting the latchbar from a position engagable with the door to a position unengaged with the door; wherein:

said locker is part of a system comprising a series of similar lockers;

each of the series of lockers comprises, securing means for restricting the latchbar in the engagable position and allowing the latchbar to move to the unengaged position, and state means for determining a current state and for placing and maintaining the securing means in a position consistent with the current state, wherein the current state comprises one of three user states comprising a locked and available state where the locker is selectable and available to any of a limited pool of users, a locked and unavailable state, and an unlocked state;

the system further comprises a plurality of user access keys operable with each state means; and each state means is configured to, allow any of the plurality of user access keys to change the current state of the state means of a user selected locker from the locked and available state to the unlocked state, and only allow the user access key that placed a specific locker in the locked and unavailable state to change the current state of the specific locker from the locked and unavailable state to the unlocked state.

49. A locker comprising:

a door;

a frame surrounding at least part of the door;

a latchbar movably coupled to the frame and engageable with the door; and means for shifting the latchbar from a position engagable with the door to a position unengaged with the door;

wherein said shifting means is moveably coupled with the door.

50. A storage locker, comprising:

access means for accessing the storage locker, comprising, a door having a latch means, a movable handle attached to the door, and a disengagement means coupled to the movable door handle;

a door frame means surrounding at least part of the door; and securing means for securing the access means, comprising, a slidable engagement means disposed in the door frame means and configured to be engagable with the latch means, a block means disposed in the door frame means and having a first position that allows movement of the slidable engagement means and a second position that blocks movement of the slidable engagement means, and an actuation device disposed in the door frame means for moving the block means into at least one of the first and second positions according to a current state of the storage locker; wherein:

when the slidable engagement means is engaged with the door latch and the blocking means is in the second position, the storage locker door is secured; and the disengagement means is configured to disengage the slidable engagement means upon movement of the moveable handle when the blocking means is in the first position.

* * * * *